United States Patent [19]

Mehren et al.

[11] 4,206,605

[45] Jun. 10, 1980

[54] INSTALLATION FOR THE POWER ASSIST OF ACTUATING DEVICES IN MOTOR VEHICLES, ESPECIALLY IN A HYDRAULIC BRAKE SYSTEM

[75] Inventors: Herbert Mehren, Poppenweiler; Helmut Wulf, Nellingen, both of Fed. Rep. of Germany

[73] Assignee: Daimler-Benz Aktiengesellschaft, Stuttgart, Fed. Rep. of Germany

[21] Appl. No.: 870,070

[22] Filed: Jan. 17, 1978

Related U.S. Application Data

[63] Continuation-in-part of Ser. No. 557,990, Mar. 12, 1975, abandoned.

[30] Foreign Application Priority Data

Mar. 12, 1974 [DE] Fed. Rep. of Germany ....... 2411701

[51] Int. Cl.$^2$ .......................... B60T 13/00; F01B 15/02
[52] U.S. Cl. ......................................... 60/545; 60/550; 60/551; 60/562; 60/582; 91/216 A; 91/217; 91/391 R; 91/438
[58] Field of Search .................... 91/374, 384, 391 R, 91/391 A, 438, 447, 378, 387, 217, 216 A; 60/550, 551, 553, 562, 552, 582, 593, 594, 543, 545, 547, 564, 572, 592; 180/105 E

[56] References Cited

U.S. PATENT DOCUMENTS

| 2,705,940 | 4/1955 | Edwards . | |
| 2,966,142 | 12/1960 | Christensen | 91/217 |
| 3,011,482 | 12/1961 | Elmer | 91/391 R |
| 3,295,420 | 1/1967 | Gleason . | |
| 3,558,102 | 1/1971 | Cruse | 91/447 |
| 3,693,504 | 9/1972 | Gilbert | 91/217 |
| 3,768,608 | 10/1973 | Fulmer | 60/547 |
| 4,114,376 | 9/1978 | Cattaneo | 60/582 |

Primary Examiner—Abraham Hershkovitz
Attorney, Agent, or Firm—Craig & Antonelli

[57] ABSTRACT

An installation for the servo-assist of actuating devices in motor vehicles, especially of a hydraulic brake system, in which a control member, such as the brake pedal, acts on an actuating device, such as a master cylinder of a two-circuit brake system by way of a servo-member; a hydraulically actuatable servo-unit is thereby arranged between the control member and the actuating device whose first part is supported at the control member and whose second part is connected with the actuating device; the actuation of the servo-unit is controllable from a hydraulic pressure medium source in the manner of a follower control by means of a control device connected with the control member.

14 Claims, 4 Drawing Figures

INSTALLATION FOR THE POWER ASSIST OF ACTUATING DEVICES IN MOTOR VEHICLES, ESPECIALLY IN A HYDRAULIC BRAKE SYSTEM

This application is a continuation-in-part of U.S. Ser. No. 557,990, filed Mar. 12, 1975 now abandoned.

The present invention relates to an installation for the power assist of actuating devices in motor vehicles, especially of a hydraulic brake installation, whereby a control member, for example, the brake pedal acts by way of an amplifying member or servo-element on an actuating member, for example, on a master cylinder of a two-circuit brake installation.

Servo-amplified brakes are known as such in motor vehicles. Customarily the vacuum of the engine is thereby used as amplifying force. These arrangements entail the disadvantage that they require a large amount of space. Additionally, they cannot be used when the motor vehicle is equipped with a central hydraulic system which is the aim in recent times to an ever-increasing extent.

The present invention is now concerned with the task to avoid the described disadvantages. Consequently, a servo-amplification or repeater system is aimed at, which exhibits a considerably smaller space requirement than the installations used at present, and which is suitable in particular for the application with a central hydraulic supply. Also, a feed-back action on the respective control element and more particularly proportionally to the amplified actuating force as well as an operating safety also in case of failure of the energy supply is to be achieved thereby. Finally, a mechanical separation between the energy supply system, i.e. between the central hydraulic supply and the force-transmitting medium, for example, the brake liquid is aimed at.

In the arrangements of the aforementioned type, this task is solved according to the present invention in that a hydraulically actuatable servo-unit is arranged between the control member and the actuating device whose first portion is supported at the control member and whose second portion is connected with the actuating device and in that the actuation of this servo-unit is controllable from a hydraulic pressure medium source in the manner of a follower control by means of a control device connected with the control member.

The installation according to the present invention offers the advantage of a considerably smaller space requirement than the prior art vacuum-actuated servo-amplifiers. It is applicable in particular for a central hydraulic supply. Also, a proportional force feedback action on the control member as well as an operating safety in case of failure of the central hydraulic supply can be achieved with the proposed installation. Finally, the mechanical separation between the energy supply and the force transmission is also of advantage.

In more recent times, systems for the automatic vehicle guidance are under development or under test. In that connection, the present invention proposes a further development such that the actuation of the servo-unit is controllable by a second control device which is connected with the hydraulic pressure medium source in parallel to the first control device connected with the control member and which is controllable by means of an electro-hydraulic servo-valve by the control pulses of the automatic vehicle guidance system.

It is further proposed by the present invention that the pressure medium is conducted to the servo-unit by way of a closure device which is held in its open position in dependence on the pressure in the hydraulic pressure medium source and which is movable by a spring into its closing position in case of a pressure decrease or pressure failure, in which it interconnects the two sides of the servo-unit with each other. In this manner, a safety against pressure failure is achieved whereby a purely mechanical actuation can take place from the control member.

Additionally, it is appropriate with the construction according to the present invention intended for a central hydraulic supply, if the pressure medium is conducted to the servo-unit by way of a shifting valve which is held electromagnetically in a position opening up the supply from the second control device and which is movable by a spring force in case of current failure into a position opening up the supply from the first control device. As a result thereof, a safety against current or electrical failure is also achieved thereby. In order that additionally an inter-engagement at will into such an automatic vehicle guidance can take place at any time, it is proposed that a switch is arranged in the energizing circuit of the solenoid which opens upon contacting or actuating the control member. In this manner, the driver is in a position at all times to interfere with or inter-engage into the automatic vehicle guidance if the condition should make this necessary.

In one embodiment according to the present invention, the servo-unit is displaceably guided at a pedal support, is constructed as hydraulic cylinder-piston unit and its housing is rigidly connected with the piston in a master brake cylinder, whereas its adjusting piston is supported on the pedal with a relatively short lever arm. This support takes place appropriately by way of a ball head. The master cylinder may be constructed in a known manner, for example, as a conventional two-circuit master cylinder.

A further feature of the present invention resides in that simultaneously the control device and the closure device are arranged in the housing of the servo-unit and both are constructed in the manner of conventional hydraulic piston slide members, and in that the piston slide member of the control device engages at the pedal with a relatively large lever arm by way of a control linkage. It is additionally proposed that axially only a slight path is provided in the housing for the piston slide member of the control device and that after overcoming this path, the piston abuts in the housing for purposes of a mechanical force transmission.

The present invention is contemplated primarily for the application with the brake system of a motor vehicle. Of course, it can be applied in a quite similar form to the clutch actuation and, in principle, of course, also to other actuations of a motor vehicle.

Accordingly, it is an object of the present invention to provide an installation for the servo-assist of actuating devices in motor vehicles, especially in a hydraulic brake system, which obviates by simple means, the aforementioned shortcomings and drawbacks encountered in the prior art.

Another object of the present invention resides in an installation for the force-assist of actuating devices in motor vehicles which avoids large space requirements and can be used without disadvantage in connection with a central hydraulic supply system.

A further object of the present invention resides in an installation for the servo-assist of a hydraulic brake installation in motor vehicles in which a force feedback effect on the respective control element proportional to the amplified actuating force as well as an operational safety in case of loss of energy supply are realized by simple means.

Still another object of the present invention resides in an installation for the servo-assist of actuating devices in motor vehicles of the type described above in which a mechanical separation takes place between the central hydraulic supply and the force transmitting medium.

Another object of the present invention resides in an installation for the servo-assist of actuating devices in motor vehicles which is equally applicable to automatically guided vehicles.

These and further objects, features and advantages of the present invention will become more apparent from the following description when taken in connection with the accompanying drawing which shows, for purposes of illustration only, three embodiments in accordance with the present invention, and wherein.

Figure 1:
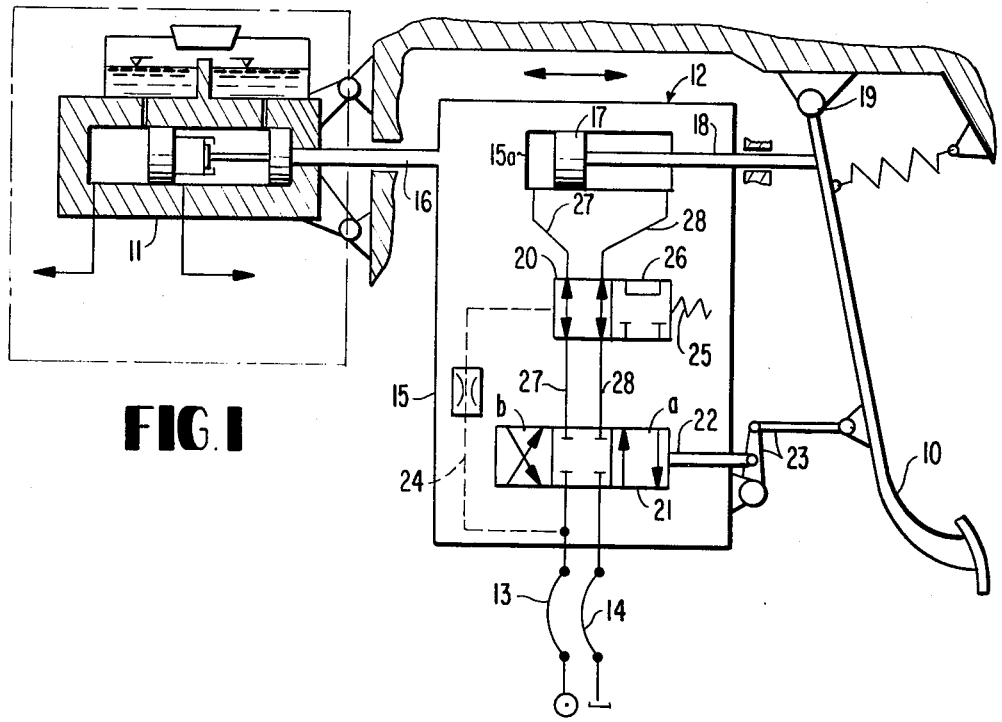
FIG. 1 is a somewhat schematic cross-sectional view through a first embodiment of a brake-actuating system with servo-amplification in accordance with the present invention.

Referring now to the drawing wherein like reference numerals are used throughout the various views to designate like parts, according to FIG. 1, a hydraulic servo-unit generally designated by reference numeral 12 is arranged between the brake pedal 10 and the master brake cylinder 11. The pedal suspension as well as the pedal construction and also the construction of the master brake cylinder 11 may take place in any known, conventional manner. They do not form any part of the present invention and therefore are not illustrated and described in detail. Illustrated in the schematic is the master brake cylinder of a two-circuit brake system of otherwise conventional type.

The hydraulic servo-unit 12 is constructed as known cylinder-piston unit. It is connected by means of the supply or feed line 13 to a pressure medium source (not shown in detail), for example, to a pump or a reservoir, whereas the line 14 represents the return line to a tank, also not shown in detail. The housing 15 of the servo-unit 12 is rigidly connected by means of the rod 16 with the piston of the master brake cylinder 11. The piston 17 of the servo-unit 12 is supported at the pedal 10 by way of a piston rod 18 and more particularly with a relatively short lever arm with respect to the point of rotation 19 thereof. A closure slide member 20 and a control device 21 are arranged additionally in the housing 15 of the servo-unit 12 which are both constructed as conventional piston slide members. The control piston of the control device 21 is thereby again connected with the pedal 10 by way of a piston rod 22 and a control linkage 23 and more particularly with a relatively large lever arm to the point of rotation 19 thereof. The closure slide member 20 is always retained in the illustrated position by the supply 13 by way of a line 24 in which it opens up the connection from the control device 21 to the servo-unit 12. In case of failure of the pressure actuation, however, it is displaced into its other end position by a spring 25, in which it closes the connection to the control device 21 and in contrast thereto connects with each other the two sides of the piston 17 by way of the recess 26.

With a non-actuated brake member 10, all elements are in the illustrated position. If the brake pedal 10 is now depressed more or less, then the piston slide member 21 of the control device is thereby displaced toward the left into its position indicated by a by way of the control linkage 23. As a result thereof, the line 27 is connected with the inlet or supply 13, and the line 28 with the return 14 so that pressure can build up on the left-hand side of the adjusting piston 17. This pressure initially displaces the entire housing 15 and therewith by way of the piston rod 16 also the piston in the master brake cylinder 11 toward the left so that the brake is actuated. The actuating force with the existing area ratio is thereby proportional to the pressure built up on the left side of the adjusting piston 17. This pressure also acts back on the piston 17 as reaction force and more particularly by way of the rod 18 also on the brake pedal 10. Since the latter is held fast in its position, the housing 15 displaces itself relative to the control piston 21 for such length of time until the illustrated center position is again attained and equilibrium thus prevails. If this braking action, i.e. the attained braking pressure does not yet suffice, then the pedal 10 is simply further depressed and the pressure increases correspondingly.

If the pedal 10 is more or less released, then the piston slide member 21 is pulled toward the right into its position b by way of the control linkage 23. In this position, the line connection takes place in a reverse manner, i.e., the line 28 is connected with the supply or inlet 13 and the line 27 with the return 14. As a result thereof, the adjusting piston 17 receives pressure on its right side whereby the housing 15 is displaced toward the right and therewith the master brake cylinder 11 is more or less relieved. Also, this operation takes place for such length of time until the equilibrium condition according to the shown illustration is again attained.

Figure 2:
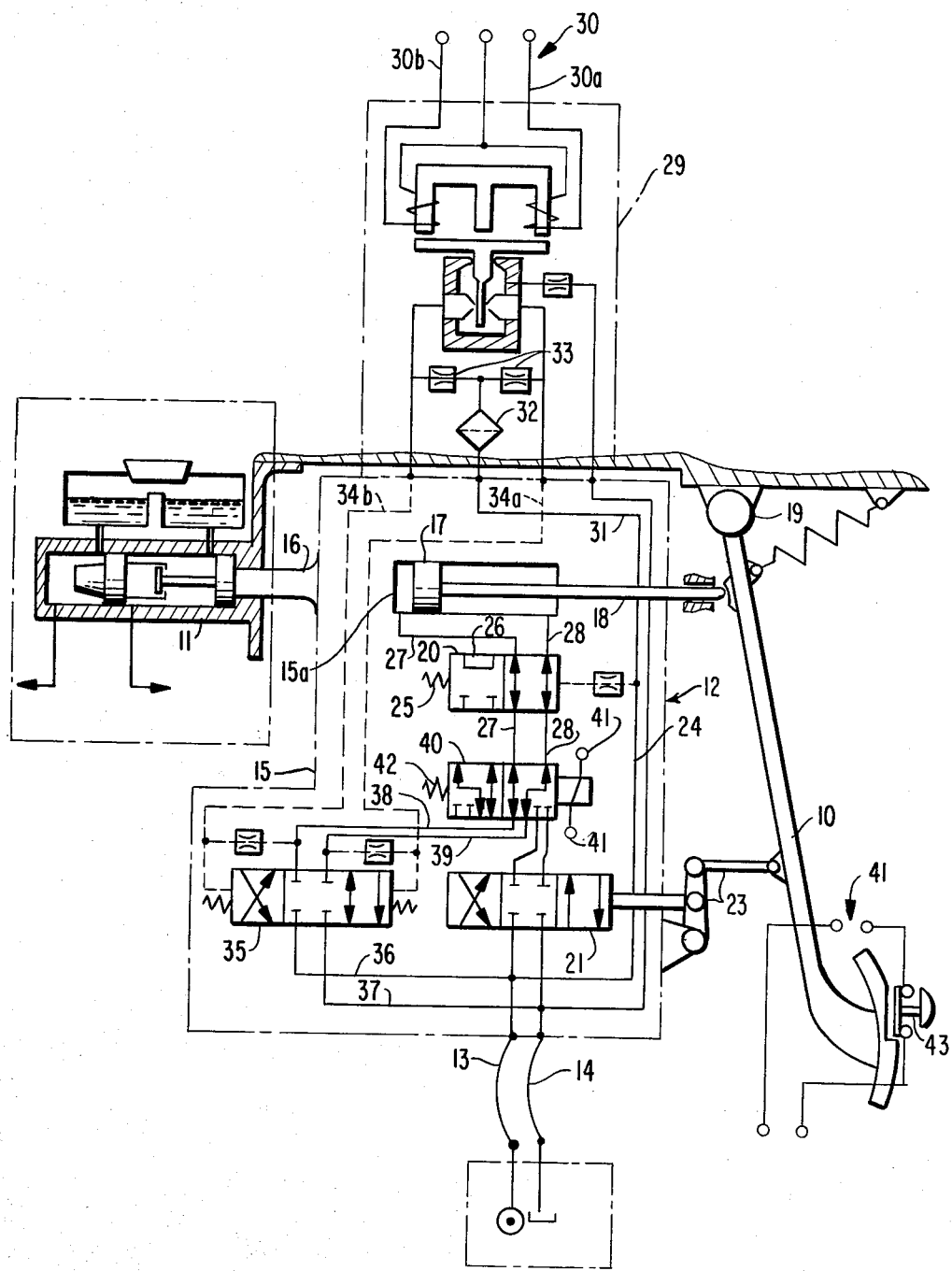
FIG. 2 is a somewhat schematic cross-sectional view of a modified embodiment of a brake-actuating system with servo-amplification in accordance with the present invention for a motor vehicle with an automatic vehicle guide system.

According to FIG. 2, the construction of the mechanical actuation, i.e., therefore, in principle of the parts 10 to 28 is exactly as with the installation according to FIG. 1 whereby, however, the housing 15a has a different shape because—as will be described more fully hereinafter—it has to accommodate additional parts. An electrohydraulic servo-valve 29 is now coordinated to the housing 15a, whose construction is known in principle and which has the purpose to convert the electrical control pulses fed by way of the lines generally designated by reference numeral 30 of the automatic vehicle guide system into pressure pulses in order that the latter can then be used for the pressure control of the installation according to the present invention. The pressure medium supply of the electrohydraulic servo-valve 29 takes place from the line 24 by way of the line section 31, whereby additionally a filter 32 and corresponding throttles 33 for the quantity limitation are provided. The functioning of such a valve is known as such so that it will not be described in detail herein for the sake of simplicity. One starts from the fact that the pulses for the actuation of the brake are introduced by way of the electric line 30a and the pulses for the release or disengagement of the brake are introduced by way of the line 30b. The corresponding pressure pulses are now available analogously at the output lines 34a and 34b.

A second control device 35 is effectively provided within the housing 15a in parallel to the control device 21, which is connected by means of the line 36 with the supply 13 and by means of the line 37 with the return 14. This second control device 35 is constructed in principle precisely as piston slide member like the control device 21. However, it is not actuated by way of a control linkage 23 from the brake pedal 10 but instead it is held in its center position by springs and is acted upon on both end faces by way of the lines 34a and 34b. The operation is believed apparent from the drawing. If during a braking pulse, a pressure build-up occurs by way of the line 34a, then the piston slide member 35 is displaced toward the left and pressure is built up on the left side of the adjusting piston 17 by way of the line 38 in the manner already described. The line 39 then serves for the connection of the right side of the piston 17 with the return. With a reverse control pulse, the operation also takes place reversely. The metering of the brake and the re-establishing of the equilibrium upon reaching the intended braking action takes place in this case by the electric pulse control and by the pressure difference at the control device 35 directly connected therewith.

The lines 38 and 39 are conducted by way of a shifting slide member 40 which is electromagnetically actuated by way of the connections 41 and is retained in the illustrated position. In this position, the control device 21—which is actuated from the pedal 10—is effectively disengaged and the control device 35 accordingly takes over the control. If the voltage disappears for any reason at the connections 41, then the spring 42 forces the shifting slide member 40 into its other position, i.e., the control device 35 controlled by the electrical pulses is now disengaged and the control device 21 controlled by the pedal 10 is now effectively engaged. This means, in other words, a shifting from the automatic vehicle guidance to the pedal actuation at will takes place.

In order that the driver is able to interfere in the automatic vehicle guidance depending on the position or on the desire, a switch 43 is coordinated to the brake pedal 10 which is normally closed and which is opened only upon engagement of the brake pedal 10. The connections 41 are connected with this switch 43 so that when contacting the brake pedal 10, the shifting slide member 42 is shifted into its other position by spring action, and the control of the brake is now taken over from the pedal 10.

Figure 3:
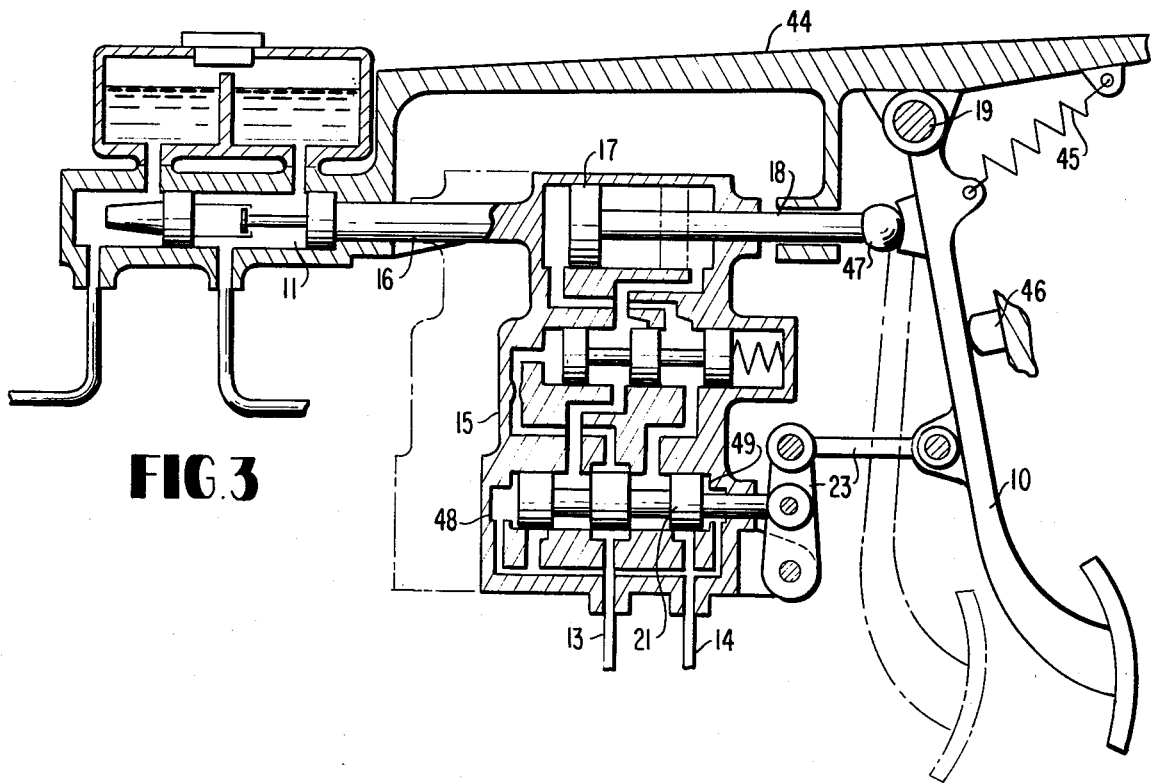
FIG. 3 is a partial cross-sectional view, on an enlarged scale, illustrating an actual embodiment according to FIG. 1.

FIG. 3 illustrates a partial cross section through an arrangement according to FIG. 1. A detailed description of this figure is not believed necessary in principle since corresponding parts are designated by corresponding reference numerals. It should only be mentioned that the pedal 10 is pivotally suspended at 19 at a pedal support 14 which also accommodates or forms the master brake cylinder 11. A return spring 45 pulls the pedal 10 constantly against an abutment 46. The piston rod 18 is supported at the pedal 10 by way of a ball head 47. It can also be recognized from this figure—which is quite important for the operation—that the piston slide member 21 can traverse only a very limited relatively small path within the housing 15 on both sides thereof. Once this slight path is used up, the piston slide member 21 abuts against the abutments 48 and 49 in the housing 15. In case of failure of the pressure medium, the piston slide member 21 can be brought into the abutment at the housing 15 from the pedal by way of the control linkage 23 and the master brake cylinder can thereby be actuated purely mechanically by way of the piston rod 16, and because the valve 20 shifts from the position shown in FIG. 1 to a second position interconnecting the chambers on opposite sides of the piston 17, and since the effective cross-sectional area to the left of the piston (as shown in FIG. 1) is much greater than the effective cross-sectional area on the right side of piston, the surface area difference on the two sides of the piston prevents a movement of the pressure medium from one side to the other. Thus, it is clear that it is inherent to the structure disclosed and shown that the breaking force may be applied via the piston 17 without it having to bottom out or pass through a "dead stroke" since the piston 17 is effectively locked upon sliding of the closure member 20 out of the position shown in FIG. 1.

Figure 4:
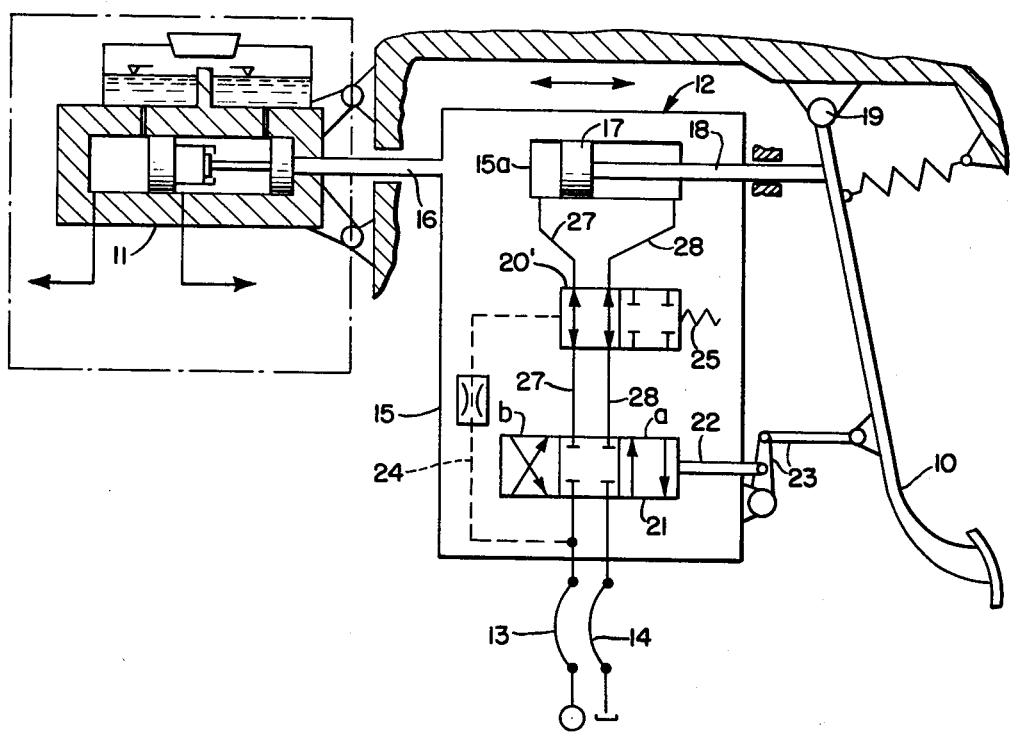
FIG. 4 is a view similar to FIG. 1, but illustrating the brake-actuating system utilizing a modified closure member.

FIG. 4 is a view similar to that of FIG. 1, but illustrates the brake-actuating system illustrated therein with a modified closure member 20'. A detailed description of this figure is not believed necessary beyond a discussion of the modified closure member 20' since this embodiment operates in essentially the same manner to produce the same results described with respect to the FIG. 1 embodiment, and since corresponding parts are designated by corresponding reference numerals. With regard to the modified closure member 20', it is noted that this closure member differs from closure member 20 only in that it is constructed so as to block the lines 27 and 28 (as represented by the dead end passage lines on the right hand side of closure member 20') instead of utilizing a recess 26. In this embodiment, like the embodiment of FIG. 1, upon the failure of the servo-pressure, the piston 17 becomes locked with respect to the cylinder 15a formed in the housing part 15 such that the master cylinder can be actuated purely mechanically by way of the piston rod 16 without any potentially hazardous delay which might result if the piston 17 had to first bottom out within the cylinder prior to it being able to transmit a brake-actuating force to the master cylinder.

While we have shown and described three embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. An installation for the force assist of brake actuating means in an automobile comprising:
   actuating means,
   an operating member for acting upon said actuating means,
   a servo-unit having a housing displaceably guided upon support means for enabling said operating member to act upon said actuating means, and including amplifier means between the operating member and the actuator means, said amplifier means comprising a piston engageable by said operating member and positioned within a cylinder so as to divide said cylinder into plural chambers, said piston having one side exposing a first effective cross-sectioned area to a first of said chambers and a second oppositely directed side exposing a second smaller effective cross-sectional area to a second of said chambers, said servo-unit further comprising a first portion of the housing connected with the operating member, a second portion of the housing operatively connected to the actuating means, and control means for controlling the actuation of said servo-unit in the manner of a follower control providing a feedback to the operating member as to the applied pressure from a hydraulic pressure medium source by means of a first control device operatively connected with the operating member, and a second control device for enabling said operating member to act upon said actuating member upon failure of said hydraulic pressure medium source, said second control device including valve means communicating said one side of said piston with said hydraulic pressure medium source and said second side of said piston with a return in a first position of said valve means and discontinuing said communication in a second position of said valve means, said valve means being displaced from said first position to said second position upon failure of said hydraulic pressure medium source.

2. An installation according to claim 1, characterized in that the actuating means includes a master cylinder of a hydraulic brake system, and said operating member is a brake pedal.

3. An installation according to claim 2, characterized in that the master cylinder forms part of a two-circuit brake system.

4. An installation according to claim 3, characterized in that the pressure medium is fed to the servo-unit by way of said valve means which is held in its open position in dependence on the pressure in the hydraulic pressure medium source and which in case of pressure decrease or pressure failure is displaceable by spring force into its second position in which it connects with each other the two sides of the piston of the servo-unit.

5. An installation according to claim 4, wherein the pressure medium is conducted to the servo-unit by way of a shifting valve means which is electromagnetically held in a position opening up the flow from the second control device through the shifting valve means and which in case of current failure is displaceable by a spring force into a position opening up the flow from the first control device through the shifting valve means.

6. An installation according to claim 5, characterized in that the solenoid of the shifting valve means is provided with an energizing circuit and a switch which is arranged in the energizing circuit of the solenoid of the shifting valve means opens upon contacting the operating member.

7. An installation according to claim 3, characterized in that the pressure medium is conducted to the servo-unit by way of a shifting valve means which is electromagnetically held in a position opening up the flow from the second control device and which in case of current failure is displaceable by a spring force into a position opening up the flow from the first control device.

8. An installation according to claim 7, characterized in that the solenoid of the shifting valve means is provided with an energizing circuit and a switch which is arranged in the energizing circuit of the solenoid of the shifting valve means opens upon contacting the operating member.

9. An installation according to claim 1, characterized in that the pressure medium is fed to the servo-unit by way of a closure means which is held in its open position in dependence on the pressure in the hydraulic pressure medium source and which in case of pressure decrease or pressure failure is displaceable by spring force into its closing position in which it connects with each other the two sides of the piston of the servo-unit.

10. An installation according to claim 1, wherein said valve means blocks flow of the hydraulic pressure medium into or out of said chambers when said valve means is in its second position.

11. An installation according to claim 1, characterized in that said servo-unit includes a housing rigidly connected with a piston in a master brake cylinder, and said piston of the servo-unit is connected to the operating member with a relatively short lever arm.

12. An installation according to claim 11, characterized in that the pressure medium is fed to the servo-unit by way of a closure means which is held in its open position in dependence on the pressure in the hydraulic pressure medium source and which in case of pressure decrease or pressure failure is displaceable by spring force into its closing position in which it connects with each other the two sides of the piston of the servo-unit.

13. An installation according to claim 12, characterized in that the first control device as well as the valve means are arranged in the housing of the servo-unit and both are constructed in the manner of a hydraulic piston slide member, the piston slide member of the control device engaging at the operating member with a relatively large lever arm by way of a control linkage.

14. An installation according to claim 11, characterized in that said control device comprises a piston slide member acted upon by said operating member with a relatively large lever arm in comparison to that of said servo-unit piston, in that axially only a slight path is present for the piston slide member of the control device within the housing of the servo-unit and in that after overcoming this path, the piston slide member abuts in the housing for purposes of a mechanical force transmission.

* * * * *